June 6, 1961 C. JAHREIS 2,987,188
STRAINER
Filed Sept. 4, 1958
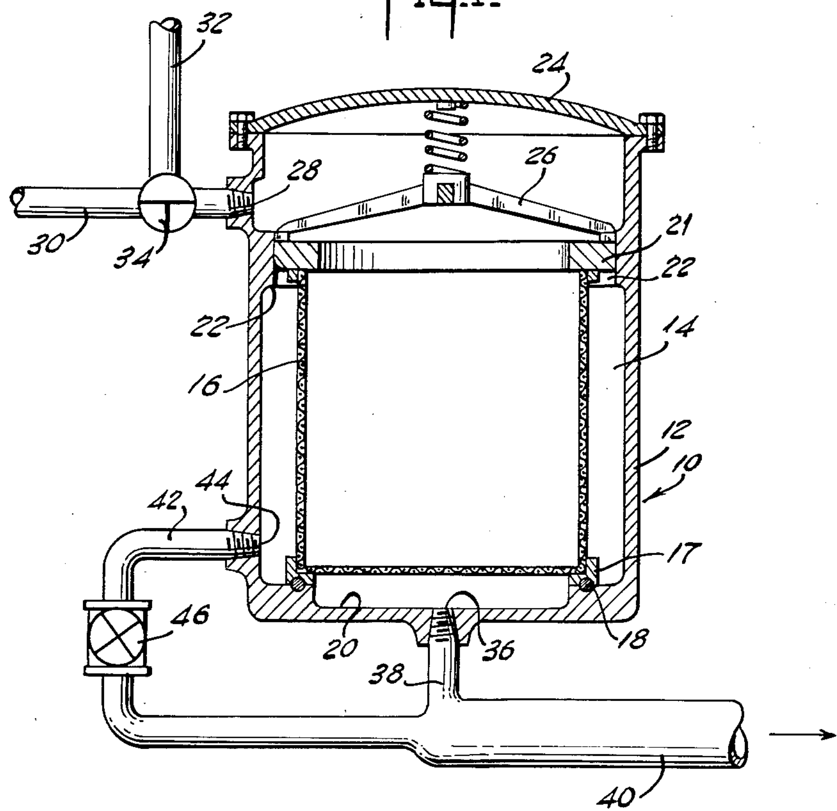
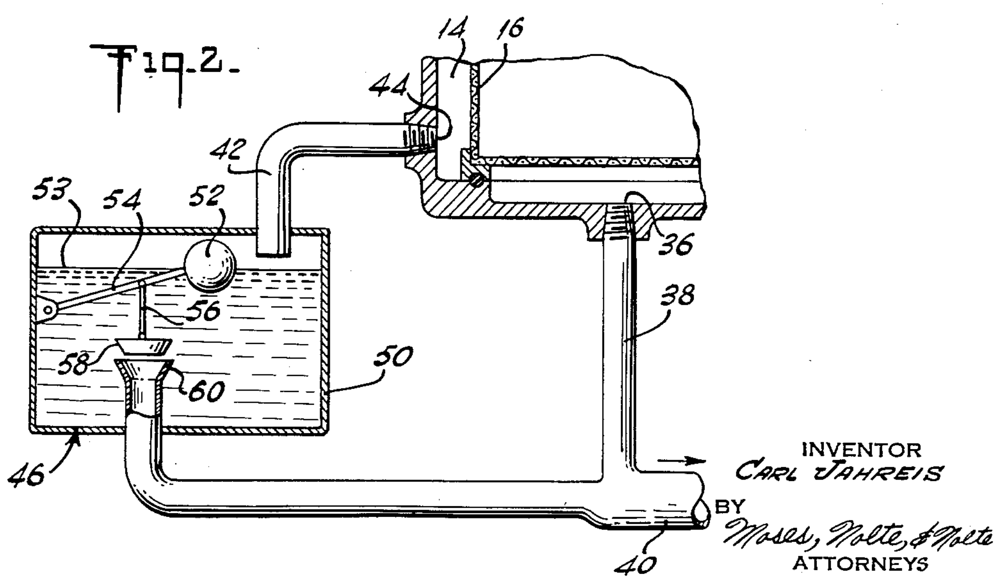
INVENTOR
CARL JAHREIS
BY
Moses, Nolte, & Nolte
ATTORNEYS United States Patent Office 2,987,188

Patented June 6, 1961

2,987,188

STRAINER

Carl Jahreis, Dumont, N.J., assignor to T. Shriver and Company, Inc., Harrison, N.J., a corporation of New Jersey Filed Sept. 4, 1958, Ser. No. 759,081
5 Claims. (Cl. 210—248)

This invention relates in general to a new and useful construction of strainers for the removal of solids from liquids. The construction of the strainer permits rapid emptying of the liquid from the strainer container so that the strainer element may be removed reasonably dry for cleaning purposes.

In the use of suction strainers for the removal of solids from liquids, one of the most common disadvantages is the fact that after the strainer basket becomes coated with solids and has to be removed for cleaning purposes, it is necessary to drain the strainer chamber and basket of liquid first. In those instances where the liquid is allowed to drain by gravity through the strainer basket, the operation may be very lengthy. If the strainer basket is removed immediately, the operation is very sloppy because of the liquid present and sometimes results in a loss of expensive liquid. As usually used, the strainer is connected through valves and associated conduits to a pump suction. In this instance, partial removal of the liquid from the strainer basket can be obtained, but as soon as a small part of the screen is exposed by dropping of the liquid level in the strainer chamber, air is drawn along the side of the strainer through the exposed area of the screen along the path of least resistance, preventing further withdrawal of the liquid from the strainer basket containing the entrained solids. In the present invention this is obviated by providing a seal between the top and bottom edges of the strainer basket and the strainer chamber which, in conjunction with suitable valving and piping herein described, permits the removal by suction of substantially all of the liquid in the strainer body, permitting the discharge of relatively dry solids.

In accordance with the invention, there is provided a novel strainer arrangement including means for sealing a strainer element at its top and bottom periphery in a strainer chamber provided with separate outlet connections so that liquid passing through the side walls of the strainer may be discharged independently of the liquid passing through the bottom of the chamber. In addition, suitable external piping and valves are provided so that the outlet through which liquid normally exits via the space between the sides of the screen and the walls of the strainer chamber may be shut off. In such event all liquid must then pass through the bottom of the screen, so that air will not be drawn through the screen until all of the liquid has been removed.

Accordingly, it is an object of this invention to provide an improved strainer construction.

A further object of the invention is to provide a strainer in which the strainer element is sealed at its top and bottom periphery and there are provided side and bottom discharge passages from the strainer chamber, the side discharge capable of being closed independently of the bottom.

A further object of the invention is to provide a strainer construction which is simple in design, rugged in construction and economical to manufacture.

The various features of novelty which characterize the invention are pointed out in the claims annexed to and forming a part of this specification. For a better understanding of the invention, its operating advantages and specific objects obtained by its use, reference should be made to the accompanying drawings and descriptive matter in which there is illustrated and described a preferred embodiment of the invention.

In the drawings:

FIG. 1 is a transverse section of the strainer constructed in accordance with the invention; and FIG. 2 is a somewhat schematic transverse section of the reverse acting control valve shown in FIG. 1.

Referring to the drawings the invention as embodied therein includes a strainer 10 having a cylindrical member 12 defining an interior strainer chamber 14 in which is positioned a strainer basket 16. The strainer basket 16 is also cylindrical and includes a lower annular flange 17 which rests on an annular sealing ring 18 at the lower portion of the chamber 14 but above a bottom wall 20 thereof. The upper portion of the basket 16 is provided with an annular flange 21 which contacts an inwardly directed flange 22 and makes a seal therewith at this location.

A cover member 24 includes a spring biased spider 26 which extends into the cylindrical chamber and holds the strainer 16 tightly against the bottom sealing ring 18. An inlet 28 is provided beneath the cover 24, which joins an inlet conduit 30. A vent line 32 also joins the conduit 30 at the location of a three-way valve 34. The three-way valve 34 permits flow from the conduit 30 into the inlet 28 when in the position indicated in the drawing. The valve 34 may be turned to permit venting of the chamber 14 through the inlet 28 and the vent line 32.

In accordance with the invention, the strainer cylinder 16 is provided with a centrally located discharge 36 at the lowermost portion thereof. The discharge leads through a short conduit 38 into a larger diameter conduit 40. A lateral by-pass discharge conduit 42 connects through a discharge opening 44 at the side to a point in the side wall of the member 12 above the bottom of the strainer basket 16. A by-pass reverse acting automatic float control valve generally designated 46 is provided in the conduit 42. The conduit 40 is made large enough to carry flow from each of conduits 38 and 42. A hand control valve may be substituted for the automatic valve 46 if desired.

The float control valve 46 comprises a tank 50 having a float 52 floating on liquid 53 and connected to a pivot arm 54 which is pivotally mounted on an interior side wall of the tank. The arm 54 carries a depending pivotally connected arm 56 with a valve seat 58 at its lower end which may operatively seat on a funnel mouthed valve face 60.

During operation, flow into the strainer 10 is through the conduit 30, the inlet 28, into the center of the basket 16 and outwardly through the central discharge 36 and the lateral discharge 44. The use of two discharges permits more rapid flow through the strainer 10 than if only a single discharge was used.

When a hand control valve 46 is used and it is desired to remove the strainer basket 16 for cleaning purposes, the three-way valve 34 is rotated to close off the conduit 32 and vent the chamber 14. At approximately the same time or a little later, the hand-operated by-pass valve 46 is closed to cut off the discharge 44. With such an arrangement, a suction pump (not shown) will rapidly empty the chamber 14 through the discharge 36, and since the discharge 36 is located at the lowermost portion of the chamber and beneath the central element of the strainer, no air will be trapped in the line 40 or the suction pump until all the liquid is drained from the strainer body. The upper portion of the strainer is vented, and emptying of the strainer will be very rapid.

The construction permits emptying of the chamber 14 without entraining air in conduits 38 or 40 once the liquid level passes below the strainer 16 as in prior constructions. The draining flow is restricted to flow through the strainer basket 16 and the central discharge 36. The sealing ring 18 makes flow down around the sides of the basket 16 impossible.

In those instances where an automatic reverse-acting float control valve 46 is used and the chamber 14 is being sucked down during emptying, air which is brought in through the vent 32 will soon enter the tank 50, as the liquid is initially drained along the path of least resistance between the inside walls of the strainer and the outside walls of the basket 16. This results in a drop in the level of the liquid 53 and causes the valve seat 58 to fall into place on the valve face 60 and stop further flow through the valve. The contents of the strainer must therefore exit through the central lowermost discharge 36 and no air will be entrained in the conduits 38 and 40 until all the liquid is drained from the strainer body.

While a specific embodiment of the invention has been shown and described in detail to illustrate the application of the invention principles, it will be understood that the invention may be embodied otherwise without departing from such principles.

I claim:

1. A filtering device comprising a casing member having an interior chamber, a filtering element having porous side and bottom walls and an open top positioned in said chamber above the bottom thereof and spaced inwardly from the interior walls of said casing, liquid sealing means to seal said filtering element adjacent its bottom and top with the interior walls of said casing, means for effecting fluid flow into the top of said filtering element and through the bottom and sides thereof including an inlet to said casing above the top of said filtering element and communicating with the center thereof, a vent connected to said inlet, valve means to simultaneously shut-off said inlet and to vent the upper portion of said filter, a lateral discharge from said casing adjacent the bottom of said filtering element and above the bottom of said casing, and a bottom discharge from said casing below the bottom wall of said filtering element.

2. A device according to claim 1 wherein said filtering element is cylindrical and the bottom wall thereof is held substantially above said discharge, and said sealing means includes a sealing ring in contact with the outer bottom periphery of said filtering element.

3. A filtering device comprising a member having a substantially cylindrical interior chamber, a cylindrical filtering element having porous sides and bottom positioned in said chamber slightly above the bottom thereof and spaced inwardly from the side walls thereof, means to seal said filtering element adjacent its top and bottom with the walls of said cylindrical chamber means for effecting fluid flow into the top of said filtering element and through the bottom and side thereof including an inlet above the top of said filtering element and communicating with the center thereof, a discharge in the bottom wall of said chamber below the bottom of said filtering element, a lateral discharge in the side wall of said chamber slightly above the bottom of said filtering element and means to automatically shut-off said lateral discharge upon the draining of said chamber a certain amount.

4. A device according to claim 3 wherein said last named means includes valve means in said lateral discharge.

5. A device according to claim 3 wherein said last named means includes a liquid level control valve in said lateral discharge, said control valve being floated by liquid to an open position during normal flow therethrough and being dropped to a closed position by the absence of liquid therein.

References Cited in the file of this patent

UNITED STATES PATENTS

| | | |
|---|---|---|
| 885,786 | Prinz | Apr. 28, 1908 |
| 1,152,831 | Monteagle | Sept. 7, 1915 |
| 1,273,656 | Paget | July 23, 1918 |
| 1,508,480 | Skinner | Sept. 16, 1924 |
| 1,677,503 | Sweetland | July 17, 1928 |
| 2,057,234 | Gorman | Oct. 13, 1936 |
| 2,651,418 | Prendergast | Sept. 8, 1953 |
| 2,698,292 | Mueller | Dec. 28, 1954 |
| 2,835,391 | Bottum | May 20, 1958 |

FOREIGN PATENTS

| | | |
|---|---|---|
| 13,376 | Great Britain | July 21, 1892 |
| 448,346 | Germany | Aug. 16, 1927 |